(12) United States Patent
Takla

(10) Patent No.: US 11,645,913 B2
(45) Date of Patent: May 9, 2023

(54) SYSTEM AND METHOD FOR LOCATION DATA FUSION AND FILTERING

(71) Applicant: Verizon Patent and Licensing Inc., Basking Ridge, NJ (US)

(72) Inventor: Mourad B. Takla, Hillsborough, NJ (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 0 days.

(21) Appl. No.: 17/528,231

(22) Filed: Nov. 17, 2021

(65) Prior Publication Data

US 2022/0076578 A1  Mar. 10, 2022

Related U.S. Application Data

(63) Continuation of application No. 16/807,243, filed on Mar. 3, 2020, now Pat. No. 11,210,951.

(51) Int. Cl.
*G08G 1/16* (2006.01)
*G08G 1/056* (2006.01)
*H04W 4/40* (2018.01)

(52) U.S. Cl.
CPC .............. *G08G 1/163* (2013.01); *G08G 1/056* (2013.01); *G08G 1/166* (2013.01); *H04W 4/40* (2018.02)

(58) Field of Classification Search
CPC ........ G08G 1/163; G08G 1/056; G08G 1/166; H04W 4/40
See application file for complete search history.

(56) References Cited

U.S. PATENT DOCUMENTS

| | | |
|---|---|---|
| 6,067,031 A | 5/2000 | Janky et al. |
| 6,266,617 B1 | 7/2001 | Evans |
| 6,370,475 B1 | 4/2002 | Breed et al. |
| 7,295,925 B2 | 11/2007 | Breed et al. |
| 7,545,261 B1 | 6/2009 | Harrington |
| 8,370,056 B2 | 2/2013 | Trombley et al. |
| 8,565,943 B2 | 10/2013 | Weinmann et al. |
| 9,047,778 B1 | 6/2015 | Cazanas et al. |
| 9,392,431 B2 | 7/2016 | Barfield et al. |
| 9,679,476 B2 | 6/2017 | Torgerson |
| 9,679,487 B1 | 6/2017 | Hayward |
| 9,841,767 B1 | 12/2017 | Hayward |
| 10,040,450 B1 | 8/2018 | Pal |

(Continued)

FOREIGN PATENT DOCUMENTS

| CN | 109059906 | 12/2018 |
|---|---|---|
| CN | 115309773 A | * 11/2022 |

*Primary Examiner* — Chico A Foxx

(57) ABSTRACT

Systems and methods limit communication of redundant telematics data in V2X systems. A communications management device receives telematics data from multiple sources in a service area and calculates a trajectory each of the objects identified by the telematics data. The communications management device selects high vulnerability trajectories based on the calculated trajectories and identifies when the telematics data from different sources, of the multiple sources, corresponds to a same vehicle. When duplicate sources are determined to provide tracking data corresponding to the same vehicle, the communications management device reports (to a collision avoidance system) the tracking data from only the most accurate of the duplicate sources.

20 Claims, 7 Drawing Sheets

(56) References Cited

U.S. PATENT DOCUMENTS

| | | |
|---|---|---|
| 10,060,751 B1 | 8/2018 | Chen et al. |
| 10,239,452 B1 | 3/2019 | Szczepaniak et al. |
| 10,509,095 B1 | 12/2019 | Kim |
| 10,699,574 B1 | 6/2020 | Zeryihun et al. |
| 10,757,248 B1 | 8/2020 | Oian et al. |
| 10,777,084 B1 | 9/2020 | Vora et al. |
| 10,937,178 B1 | 3/2021 | Srinivasan |
| 10,940,793 B1 | 3/2021 | Damsaz et al. |
| 10,984,543 B1 | 4/2021 | Srinivasan |
| 2002/0193121 A1 | 12/2002 | Nowak et al. |
| 2003/0016147 A1 | 1/2003 | Evans |
| 2003/0018428 A1 | 1/2003 | Knockeart et al. |
| 2004/0185875 A1 | 9/2004 | Diacakis et al. |
| 2004/0203850 A1 | 10/2004 | Oesterling |
| 2005/0197771 A1 | 9/2005 | Seick et al. |
| 2009/0228157 A1 | 9/2009 | Breed |
| 2010/0169009 A1 | 7/2010 | Breed et al. |
| 2011/0040481 A1 | 2/2011 | Trombley et al. |
| 2012/0245756 A1* | 9/2012 | Cooprider ............ B60W 50/14 701/1 |
| 2014/0009275 A1 | 1/2014 | Bowers et al. |
| 2014/0081483 A1 | 3/2014 | Weinmann et al. |
| 2015/0170519 A1 | 6/2015 | Langgood et al. |
| 2015/0248731 A1 | 9/2015 | Fernandes et al. |
| 2015/0262487 A1 | 9/2015 | Cazanas et al. |
| 2015/0321665 A1* | 11/2015 | Pandita ............ B60W 50/0097 701/532 |
| 2016/0018232 A1 | 1/2016 | Bankowski et al. |
| 2016/0093212 A1 | 3/2016 | Barfield et al. |
| 2016/0132705 A1 | 5/2016 | Kovarik et al. |
| 2016/0272196 A1 | 9/2016 | Hocking et al. |
| 2016/0280134 A1 | 9/2016 | Miura et al. |
| 2016/0343249 A1 | 11/2016 | Gao et al. |
| 2017/0257602 A1 | 9/2017 | Axson et al. |
| 2017/0314943 A1 | 11/2017 | Fujita |
| 2018/0025553 A1 | 1/2018 | Bajwa et al. |
| 2018/0029533 A1 | 2/2018 | Goudy et al. |
| 2018/0047288 A1 | 2/2018 | Cordell et al. |
| 2018/0173229 A1* | 6/2018 | Huang ................ G05D 1/0278 |
| 2018/0184245 A1* | 6/2018 | Park ...................... H04W 4/023 |
| 2018/0336780 A1 | 11/2018 | Ran et al. |
| 2019/0025059 A1* | 1/2019 | Yoo ........................ G01S 19/28 |
| 2019/0056238 A1 | 2/2019 | Schilling et al. |
| 2019/0061755 A1 | 2/2019 | Chen et al. |
| 2019/0132800 A1 | 5/2019 | Kim et al. |
| 2019/0220462 A1 | 7/2019 | Sun et al. |
| 2019/0302767 A1* | 10/2019 | Sapp .................... G05D 1/0246 |
| 2019/0391276 A1 | 12/2019 | Kroeger et al. |
| 2020/0120451 A1 | 4/2020 | Liu et al. |
| 2020/0166366 A1 | 5/2020 | Herman et al. |
| 2020/0174471 A1* | 6/2020 | Du .......................... H04W 4/38 |
| 2020/0331465 A1* | 10/2020 | Herman ................ G06N 3/084 |
| 2020/0349666 A1 | 11/2020 | Hodge et al. |
| 2020/0404018 A1 | 12/2020 | Naserian et al. |
| 2021/0082296 A1 | 3/2021 | Jacobus et al. |

\* cited by examiner

SYSTEM AND METHOD FOR LOCATION DATA FUSION AND FILTERING

CROSS-REFERENCE TO RELATED APPLICATION

This application is a continuation of U.S. patent application Ser. No. 16/807,243, filed on Mar. 3, 2020, and titled "System and Method for Location Data Fusion and Filtering," the contents of which are incorporated herein by reference

BACKGROUND INFORMATION

Next generation wireless communication systems promise reduced latency and increased bandwidth, and thus may permit road vehicles to communicate with each other and/or with various road infrastructure elements and other objects at a much larger scale than possible today. Accordingly, vehicle-to-everything (V2X) communications allow vehicles to exchange information with other vehicles (e.g., vehicle-to-vehicle (V2V) communications), with an infrastructure (e.g., vehicle-to-infrastructure (V2I) communications), with pedestrians (e.g., vehicle-to-pedestrian (V2P) communications), etc. V2X communications may enhance safety and improve vehicle energy efficiency.

DETAILED DESCRIPTION OF EXAMPLE EMBODIMENTS

The following detailed description refers to the accompanying drawings. The same reference numbers in different drawings identify the same or similar elements.

In vehicle-to-everything (V2X) systems, locations of vehicles and pedestrians might be reported by different sources, such as vehicle on-board diagnostic devices (OBDs), also referred to at telematics devices), roadside cameras, global positioning systems (GPS), and the like. Some of these sources might provide overlapping data, while others are unique. A majority of the reported objects are constantly changing their locations and can be detected in different sources, and consequently be identified as different objects. An innovative way is needed to group this data and identify unique data points to share with other vehicles in order to improve overall road safety.

Different sources of location data have different levels of accuracy. Given a group of data points from different sources, standard clustering algorithms typically seek to determine a representative location of the multiple data points. In contrast, systems and methods described herein determine whether a group of data point from different sources identify one or multiple vehicles. I If only a single vehicle is identified, the systems may determine which data provides the most accurate information (for example location information) reported by these sources.

Figure 1:
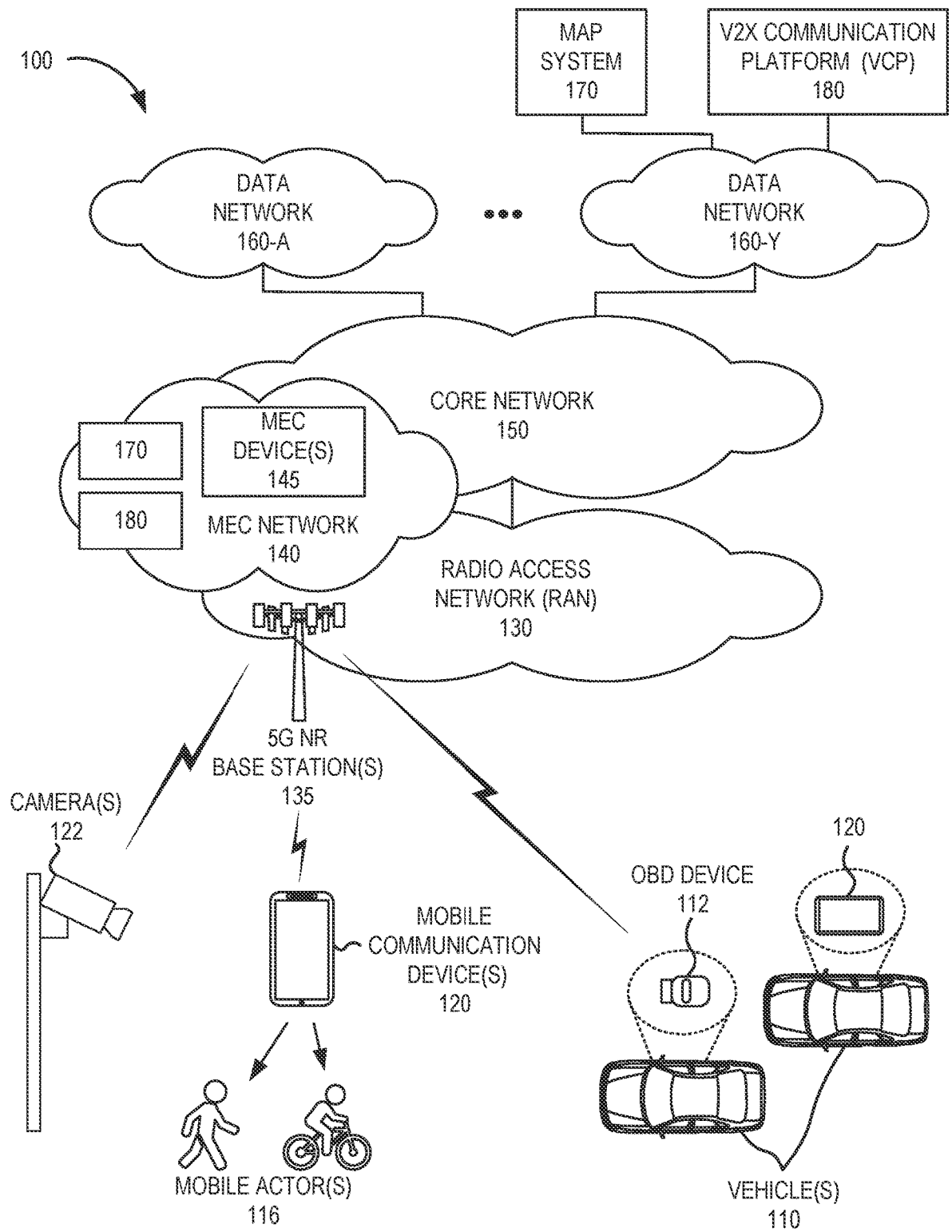
FIG. 1 illustrates an environment according to an implementation described herein.

FIG. 1 is a diagram of an exemplary environment 100 in which the systems and/or methods, described herein, may be implemented. As shown in FIG. 1, environment 100 may include one or more vehicles 110, mobile actors 116 (e.g., pedestrians, cyclists, scooters, etc.), mobile communication devices 120, cameras 122, a radio access network (RAN) 130, a MEC network 140, a core network 150, and data networks 160-A to 160-Y, a map system 170, and a V2X communications platform (VCP) 180.

Vehicles 110 may include motorized vehicles in an area serviced by RAN 130. Some vehicles 110 may include an OBD device 112 installed in the vehicle. OBD device 112 may be plugged into the OBD port of vehicle 110 and may collect information relating to the status and operation of vehicle 110. Furthermore, OBD device 112 may include a group of sensors, such as position, bearing, and/or acceleration sensors, that generate information relating to the movement of vehicle 110. The OBD information, for a particular vehicle 110, may include one or more of a Real-Time Kinematic (RTK) position for the particular vehicle, a heading for the particular vehicle, a speed for the particular vehicle, an acceleration for the particular vehicle, a type and size of vehicle for the particular vehicle, a vehicle component status for the particular vehicle (e.g., brake status, turn signal status, gear status, etc.). RTK positioning may be used to enhance GPS information using a reference station and to determine vehicle position down to a centimeter (cm) range.

According to an implementation, OBD device 112 may also include a communications management device (e.g., V2X communications handler 610, FIG. 6) and/or collision avoidance system (e.g., collision avoidance system 620, FIG. 6) to analyze information received from other BD devices 112 (e.g., in other vehicles 110), mobile communication devices 120, cameras 122, and map system 170 to manage incoming location information and predict collisions involving vehicles 110. OBD device 112 may communicate with MEC network 140 via RAN 130 using, for example, 5G NR wireless signals.

Mobile actors 116 may include pedestrians, bicyclists, and electric scooters in a vicinity of vehicles 110. The vicinity may include, for example, a default radius around a vehicle 110, a geo-fence calculation, or an area determined by any other algorithm, but not limited thereto. Mobile communication devices 120 may be associated with particular vehicles 110 or mobile actors 116. For example, a driver of vehicle 110, a passenger of vehicle 110, and a mobile actor 116 may each have in possession a mobile communication device 120.

Mobile communication device 120 may include a handheld wireless communication device (e.g., a mobile phone, a smart phone, a tablet device, etc.); a wearable computer device (e.g., a head-mounted display computer device, a head-mounted camera device, a wristwatch computer device, etc.); a laptop computer, a tablet computer, a navigation device, or another type of portable computer device with wireless communication capabilities and/or a user interface. Mobile communication device 120 may communicate with MEC network 140 via RAN 130 using 5G NR wireless signals.

Cameras 122 may be installed throughout the area associated with vehicles 110. Cameras may be installed on traffic lights, poles, buildings, and/or other structures in positions that enable capturing images of vehicles 110 and mobile actors 116 in the area. Each camera 122 may include a digital camera for capturing and digitizing images using an array of sensors. The captured image data may include a continuous image sequence (e.g., video), a limited image sequence, still images, and/or a combination thereof. Cameras 122 may capture image and/or video data using visible light, infrared light, and/or other non-visible electromagnetic radiation (e.g., ultraviolet light, terahertz radiation, etc.). Cameras 122 may include wireless communication functionality to transmit captured images or video of vehicles 110 and mobile actors 116 to MEC network 140 via RAN 130 using 5G NR wireless signals. In some implementations, camera 122 may transmit captured raw images or video to MEC network 140. In other implementations, camera 122 may perform object recognition to identify particular vehicles 110 and/or mobile actors 116 in the captured images or videos and/or determine the position, bearing, speed, and/or acceleration of particular vehicles 110 and/or mobile actors 116 in the captured images or videos.

RAN 130 may include one or more 5G NR base stations 135. Each 5G NR base stations 135 may include devices and/or components configured to enable wireless communication with OBD devices 112, mobile communication devices 120, cameras 122, and/or other devices perceived as user equipment (UE) devices by 5G NR base station 135. 5G NR base station 135 may be configured to communicate with the UE devices as a gNodeB that uses a 5G NR air interface. A gNodeB may include one or more antenna arrays configured to send and receive wireless signals in the mm-wave frequency range. Additionally, 5G NR base station 135 may include a Fourth Generation (4G) base station configured to communicate with UE devices as an eNodeB that uses a 4G Long Term Evolution (LTE) air interface. In some implementations, 5G NR base station 135 may be associated with MEC network 140.

MEC network 140 may provide MEC services for UE devices (e.g., OBD devices 112, mobile communication devices 120, cameras 122, etc.) attached to 5G NR base station 135. MEC network 140 may be in proximity to the one or more 5G NR base stations 135 from a geographic and network topology perspective. As an example, MEC network 140 may be located on a same site as 5G NR base station 135. As another example, MEC network 140 may be geographically close to 5G NR base station 135, and reachable via fewer network hops and/or fewer switches, than other base stations and/or data networks 160. As yet another example, MEC network 140 may be reached without having to interface with a gateway device, such as a 4G Packet Data Network Gateway (PGW) or a 5G User Plane Function (UPF).

MEC network 140 may interface with RAN 130 and/or with core network 150 via a MEC gateway device (not shown in FIG. 1). In some implementations, MEC network 140 may be connected to RAN 130 via a direct connection to 5G NR base station 135. For example, MEC network 140 may connect to a gNodeB via an N3 interface. In other implementations, MEC network 140 may include, or be included in, core network 150. As an example, MEC network 140 may connect to a Session Management Function (SMF) via an N4 interface. MEC network 140 may support UE device mobility and handover application sessions between MEC network 140 and another MEC network.

MEC network 140 may include a MEC device 145. MEC network 140 may support device registration, discovery, and/or management of MEC devices 145 in MEC network 140. MEC device 145 may include particular hardware components, such as central processing units (CPUs), graphics processing units (GPUs), tensor or dataflow processing units, hardware accelerators, and/or other types of hardware components. Furthermore, MEC device 145 may include particular software components, such as a particular operating system, virtual machine, virtual container, application, and/or another type of software components or programs. MEC device 145 may connect to 5G NR base station 135 in RAN 130 and provide one or more MEC services to UE devices connected to 5G NR base station 135. As an example, a MEC service may include a service associated with a particular application. Consistent with implementations described herein, MEC device 145 may include a communications management device (e.g., V2X communications handler 610, FIG. 6) and/or collision avoidance system (e.g., collision avoidance system 620, FIG. 6) to analyze telematics data and other information received from OBD devices 112, mobile communication devices 120, cameras 122, and map system 170 to manage incoming location information and predict collisions involving vehicles 110.

Core network 150 may manage communication sessions for UE devices serviced by 5G NR base station 135. For example, core network 150 may establish an IP connection between UE devices and a data network 160. Furthermore, core network 150 may enable UE devices to communicate with an application server, and/or another type of device, located in a packet data network 160 using a communication method that does not require the establishment of an Internet Protocol (IP) connection between a UE device and packet data network 160. For example, in other implementations, a collision avoidance system may be included in a server device in core network 150. In some implementations, core network 150 may include an LTE core network (e.g., an evolved packet core (EPC) network). In other implementations, core network 150 may include a 5G core network.

Data networks 160-A to 160-Y may each include a packet data network. A particular packet data network 160 may be associated with an Access Point Name (APN) and a UE device may request a connection to the particular data network 160 using the APN. Data network 160 may include, and/or be connected to and enable communication with, a local area network (LAN), a wide area network (WAN), a metropolitan area network (MAN), an optical network, a cable television network, a satellite network, a wireless network (e.g., a CDMA network, a general packet radio service (GPRS) network, and/or an LTE network), an ad hoc network, a telephone network (e.g., the Public Switched Telephone Network (PSTN) or a cellular network), an intranet, or a combination of networks.

Map system 170 may include one or more computer devices, such as server devices, configured to generate and/or maintain maps of the area associated with 5G NR base station 135 and vehicles 110. A map of the area may include the location of streets and street lanes, buildings and other structures, traffic lights, pedestrian walkways and pedestrian crossings, bicycle trails and bicycle trail crossings, and/or other information that may be used by a collision avoidance system to prevent collisions. Map system 170 may provide maps of relevant areas to MEC device 145 and/or ODB devices 112, for example. In another implementation, some or all of MAP system 170 may be included within MEC network 140. For example, map system 170 may be stored in one or more MEC devices 145.

V2X communications platform 180 may manage V2X communications for environment 100. According to one implementation, V2X communications platform 180 may communicate with MEC devices 145 and OBD devices 112 to orchestrate V2X services. V2X communications platform 180 may receive dynamic information from devices in vehicles 110, mobile communication devices 120, etc. In another implementation, V2X communications platform 180 may be included within MEC network 140. For example, V2X communications platform 180 may be implemented in one or more MEC devices 145.

Although FIG. 1 shows exemplary components of environment 100, in other implementations, environment 100 may include fewer components, different components, differently arranged components, or additional components than depicted in FIG. 1. Additionally, or alternatively, one or more components of environment 100 may perform functions described as being performed by one or more other components of environment 100.

Figure 2:
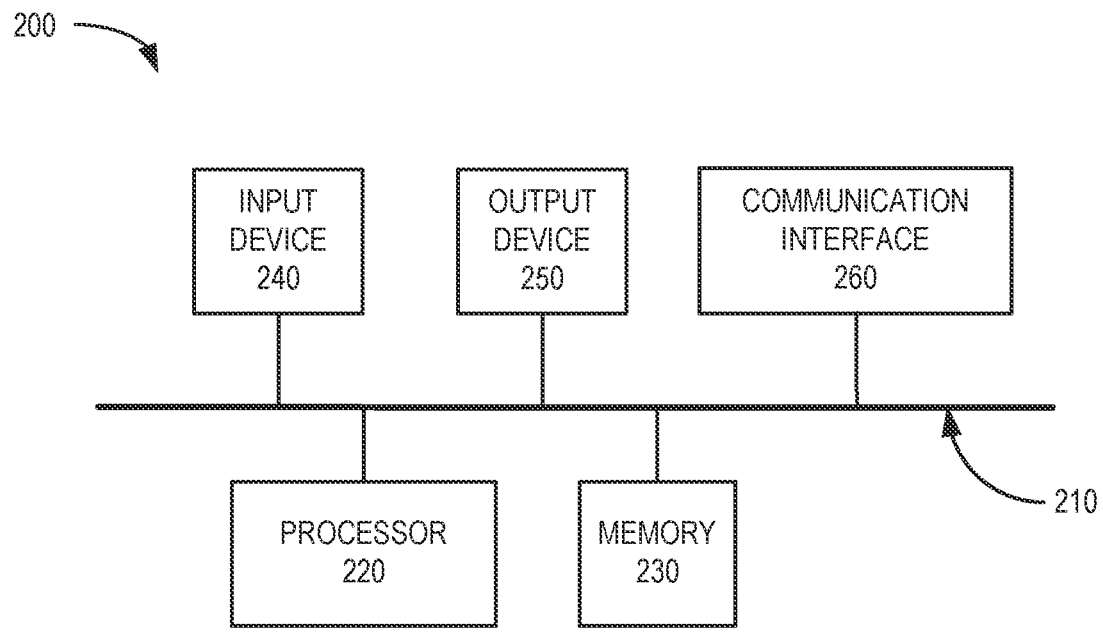
FIG. 2 illustrates exemplary components of a device that may be included in the environment of FIG. 1 according to an implementation described herein.

FIG. 2 is a diagram illustrating example components of a device 200 according to an implementation described herein. OBD device 112, mobile communication device 120, camera 122, base station 135, MEC device 145, map system 170, and/or VCP 180 may each include, or be implemented on, one or more devices 200. As shown in FIG. 2, device 200 may include a bus 210, a processor 220, a memory 230, an input device 240, an output device 250, and a communication interface 260.

Bus 210 may include a path that permits communication among the components of device 200. Processor 220 may include any type of single-core processor, multi-core processor, microprocessor, latch-based processor, central processing unit (CPU), graphics processing unit (GPU), tensor processing unit (TPU), hardware accelerator, and/or processing logic (or families of processors, microprocessors, and/or processing logics) that interprets and executes instructions. In other embodiments, processor 220 may include an application-specific integrated circuit (ASIC), a field-programmable gate array (FPGA), and/or another type of integrated circuit or processing logic.

Memory 230 may include any type of dynamic storage device that may store information and/or instructions, for execution by processor 220, and/or any type of non-volatile storage device that may store information for use by processor 220. For example, memory 230 may include a random access memory (RAM) or another type of dynamic storage device, a read-only memory (ROM) device or another type of static storage device, a content addressable memory (CAM), a magnetic and/or optical recording memory device and its corresponding drive (e.g., a hard disk drive, optical drive, etc.), and/or a removable form of memory, such as a flash memory.

Input device 240 may allow an operator to input information into device 200. Input device 240 may include, for example, a keyboard, a mouse, a pen, a microphone, a remote control, an audio capture device, an image and/or video capture device, a touch-screen display, and/or another type of input device. In some implementations, device 200 may be managed remotely and may not include input device 240. In other words, device 200 may be "headless" and may not include a keyboard, for example.

Output device 250 may output information to an operator of device 200. Output device 250 may include a display, a printer, a speaker, and/or another type of output device. For example, device 200 may include a display, which may include a liquid-crystal display (LCD) for displaying content to the user. In some implementations, device 200 may be managed remotely and may not include output device 250. In other words, device 200 may be "headless" and may not include a display, for example.

Communication interface 260 may include a transceiver that enables device 200 to communicate with other devices and/or systems via wireless communications (e.g., radio frequency, infrared, and/or visual optics, etc.), wired communications (e.g., conductive wire, twisted pair cable, coaxial cable, transmission line, fiber optic cable, and/or waveguide, etc.), or a combination of wireless and wired communications. Communication interface 260 may include a transmitter that converts baseband signals to radio frequency (RF) signals and/or a receiver that converts RF signals to baseband signals. Communication interface 260 may be coupled to an antenna for transmitting and receiving RF signals.

Communication interface 260 may include a logical component that includes input and/or output ports, input and/or output systems, and/or other input and output components that facilitate the transmission of data to other devices. For example, communication interface 260 may include a network interface card (e.g., Ethernet card) for wired communications and/or a wireless network interface (e.g., a WiFi) card for wireless communications. Communication interface 260 may also include a universal serial bus (USB) port for communications over a cable, a Bluetooth™ wireless interface, a radio-frequency identification (RFID) interface, a near-field communications (NFC) wireless interface, and/or any other type of interface that converts data from one form to another form.

As will be described in detail below, device 200 may perform certain operations relating to collision danger detection and alerts. Device 200 may perform these operations in response to processor 220 executing software instructions contained in a computer-readable medium, such as memory 230. A computer-readable medium may be defined as a non-transitory memory device. A memory device may be implemented within a single physical memory device or spread across multiple physical memory devices. The software instructions may be read into memory 230 from another computer-readable medium or from another device. The software instructions contained in memory 230 may cause processor 220 to perform processes described herein. Alternatively, hardwired circuitry may be used in place of, or in combination with, software instructions to implement processes described herein. Thus, implementations described herein are not limited to any specific combination of hardware circuitry and software.

Although FIG. 2 shows exemplary components of device 200, in other implementations, device 200 may include fewer components, different components, additional components, or differently arranged components than depicted in FIG. 2. Additionally, or alternatively, one or more components of device 200 may perform one or more tasks described as being performed by one or more other components of device 200.

Figure 3:
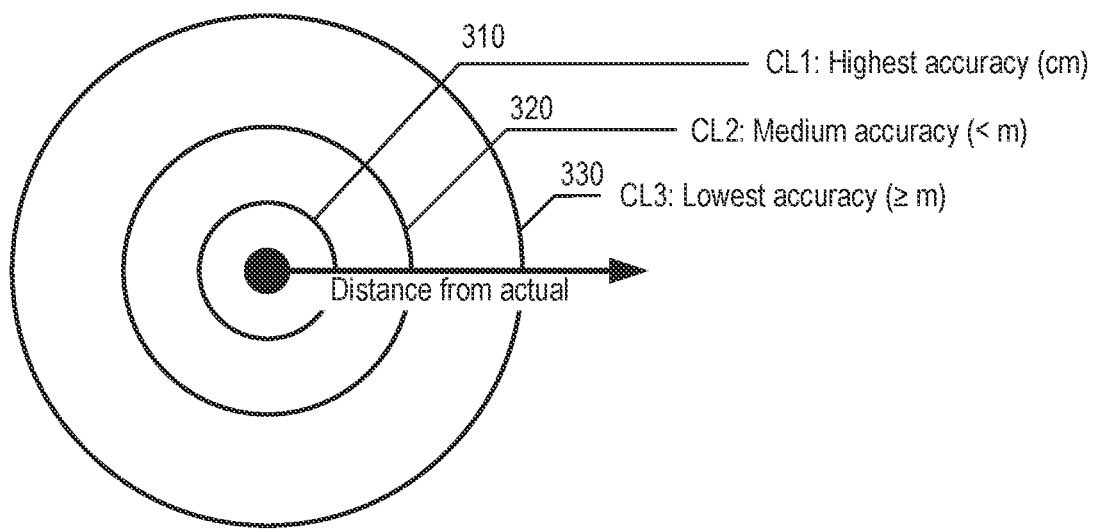
FIG. 3 is an illustration of location data confidence levels based on technology type.

Information sources, such as OBD 112, roadside camera 122, and GPS systems (e.g., delivered via mobile communication devices 120), provide location data with varying degrees of accuracy due to different technology types. Based on known different degrees of accuracy, location data from different sources may be grouped into confidence levels. FIG. 3 provides an illustration of location data confidence levels based on technology type. RTK-based location information, available through OBD 122, for example, may generally be considered the most accurate type of location measurement, with centimeter level accuracy. RTK data, or data from an equivalently accurate location system, may thus be assigned a highest confidence level, CL1, as indicated at reference 310.

Wireless and GPS triangulation location data may provide lower accuracy than RTK, but generally is accurate to less than one meter. Wireless and GPS triangulation location data may be obtained, for example, from mobile communication devices 120 or after-market vehicle navigation devices. Triangulation location data, or data from an equivalently accurate location system, may be assigned a medium confidence level, CL2, as indicated at reference 320.

GPS location data (e.g., from satellite tracking of mobile communication devices 120) tends be less accurate than other aforementioned sources. GPS location data may generally be accurate to about one meter or more. GPS location data, or data from an equivalently accurate location system, and may be assigned a low confidence level, CL3, as indicated at reference 320.

Camera-based location data (e.g., from cameras 122) may have varied accuracy. To be applied effectively in a V2X system, the camera source must define the level of accuracy for detected objects. Camera-based location data may typically have accuracy corresponding to either CL2 or CL3. According to one implementation, camera-based location data, or other similar types of location data, may be assigned to CL3 as a default.

Although FIG. 3 illustrates three classification levels, in other implementations, a different number of classification or different accuracies may be associated with each classification level may be used.

Figure 4:
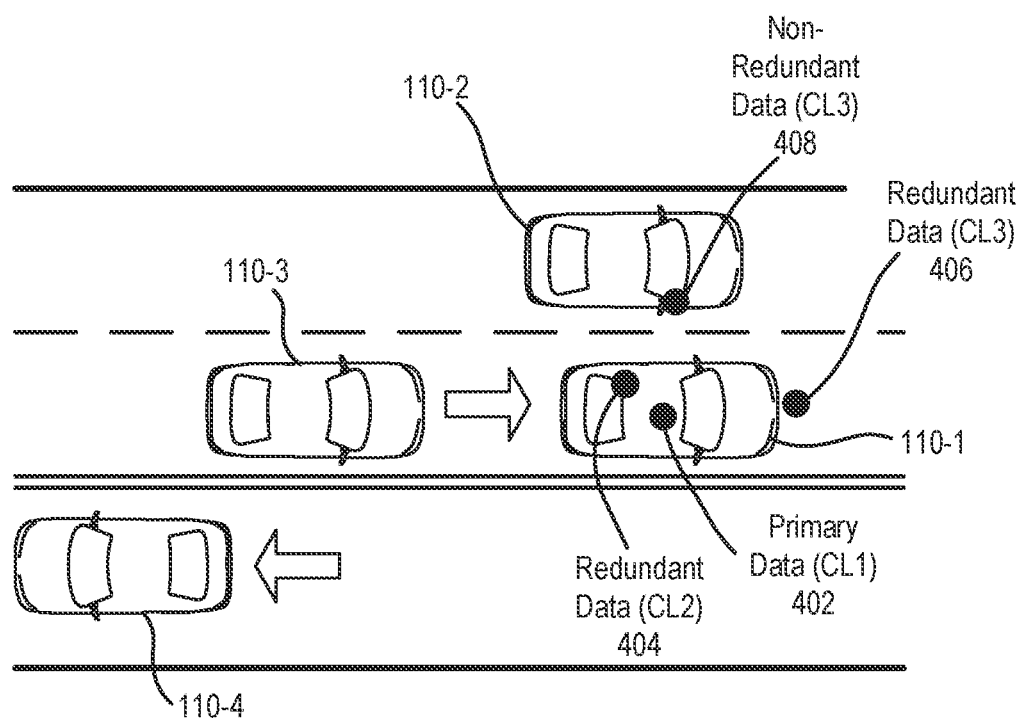
FIG. 4 is an illustration of a data cluster showing variations in location data.

FIG. 4 is an illustration of a data cluster showing variations in location data. In the example of FIG. 4, assume location data, which is associated with vehicle 110-1, from three different sources is provided. Primary location data (CL1) 402 may be provided, for example, from an OBD 112 (not shown) for vehicle 110-1. Redundant data (CL2) 404 may be provided, for example, from a triangulation of a mobile device 120 of a passenger in vehicle 110-1. Redundant data (CL3) 406 may be provided, for example, from a GPS tracking signal for another mobile device 120 in vehicle 110-1. As further shown in FIG. 4, assume location data, which is associated with vehicle 110-2, from another source is provided. Non-redundant data (CL3) 408 may be provided, for example, from a GPS tracking signal for another mobile device 120 in vehicle 110-2.

Figure 6:
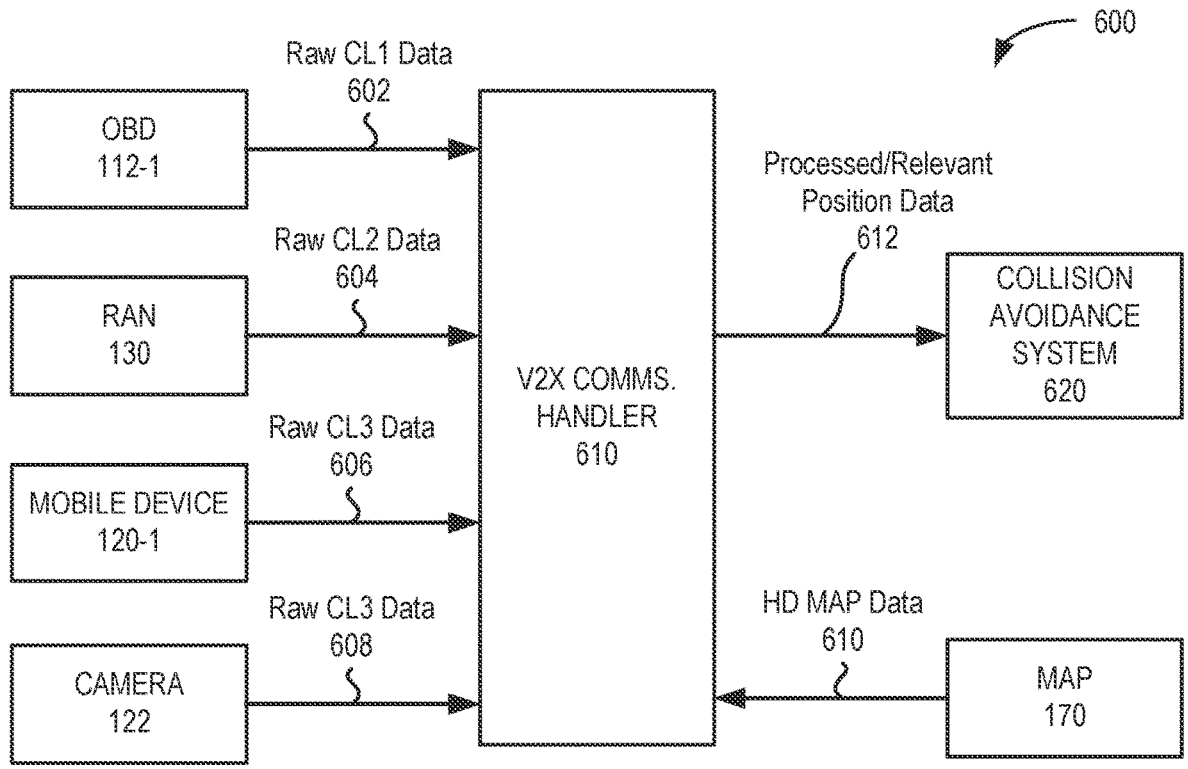
FIG. 6 is a diagram illustrating communication among devices in a portion of the environment of FIG. 1.

Each of primary location data (CL1) 402, redundant data (CL2) 404, redundant data (CL3) 406, and non-redundant data (CL3) 408 may be reported to a component of V2X system, such as MEC device 145, one or more OBDs 112, and/or VCP 180 executing a V2X communications handler 610 (FIG. 6). To enable a vehicle collision avoidance system (e.g., for vehicle 110-3) to best interpret objects, systems and methods described herein determine which of data 402, 404, 406, and 408 is associated with a single vehicle (e.g., vehicle 110-1) such that redundant, less-accurate data can be excluded.

Figure 5:
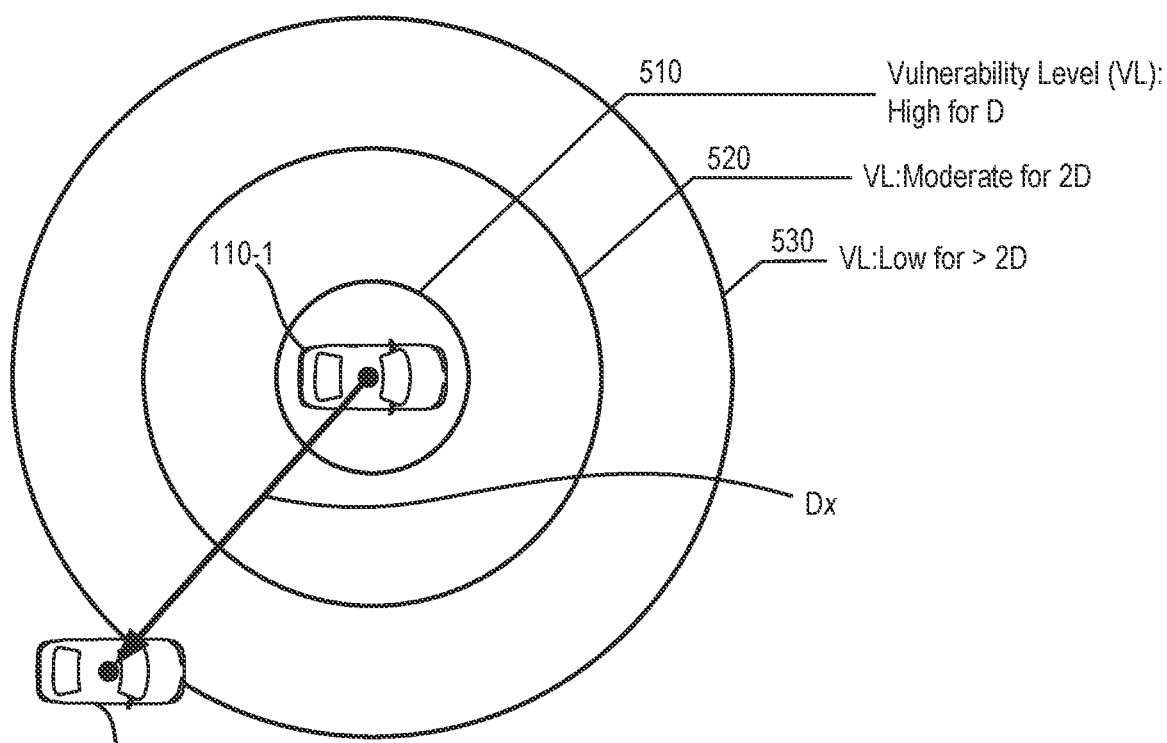
FIG. 5 is diagram illustrating vulnerability levels between vehicles.

FIG. 5 is diagram illustrating vulnerability levels between vehicles. According to an implementation, vulnerability may be a defined value that is assigned a required level of accuracy at different distances. At short distances, for example, high location data accuracy of a reported object is required. At long distances, the location data accuracy of a reported object is less important, as there is no immediate impact on the receiving vehicle and there is enough time to receive more accurate information about the location of the object if it is on a collision course.

A default distance (D) for high vulnerability may be defined by the equation:

$$D=(V1+V2)*\Delta T,$$

where V1 and V2 are vector speeds associated with different vehicles (e.g., vehicles 110-1 and 110-2 in FIG. 5), and where $\Delta T$ is the average time required for vehicles to stop (e.g., about 4.5 seconds). Thus, vehicle speed may be added if vehicles are moving towards each other, and subtracted if they are moving away from each other.

According to an implementation, a high vulnerability level 510 (VL:High) may be assigned as D or less. A moderate vulnerability level 520 (VL:Moderate) may be assigned as greater than D up to 2D. A low vulnerability level 530 (VL:Low) may be assigned as greater than 2D. As shown in FIG. 5, Dx is the measured distance between vehicles (e.g., vehicles 110-1 and 110-2 in FIG. 5).

The vulnerability level (VL) for two vehicles at with vector speeds of V1 and V2 may be determined such that:
If (Dx<D), then VL=VL:High,
  Else, if [(Dx≥D) && (Dx<2D)], then VL=VL:Moderate
  Else VL=VL:Low A vulnerability level may be use used to decide the accuracy (and effort) used to accurately determine the location of a vehicle in order to report it to another vehicle. More particularly, the vulnerability level may impact the accuracy of the reported location data. The higher the calculated VL (e.g., VL1) the more digits (e.g., for location coordinates) may be used to represent the location, while the lower calculated VL (e.g., VL3) may allow for fewer digits to be used to describe an object's location. Thus, the same vehicle/object may be reported as VL:High for one vehicle, and reported as VL:Low for another vehicle. As an example, referring to FIG. 4, data points for vehicle 110-1 may be calculated as VL:High for vehicle 110-3, while the same data points for vehicle 110-1 may be calculated as VL:Low for vehicle 110-4. As described further herein, a V2X communications handler (e.g., V2X communications handler 610) or another system may use the vulnerability level to prioritize for which data points, from a group of data points, filtering and/or fusion techniques should first be applied.

FIG. 6 is a diagram illustrating communication among devices in a portion 600 of environment 100. Portion 600 may include OBD 112-1, camera 122, mobile device 120, RAN 130, a V2X communications handler 610, and a collision avoidance system 620. In the example of FIG. 6, assume MEC device 145 executes V2X communications handler 610 and collision avoidance system 620 for vehicle 110-2, which may have an OBD or another telematics system in communication with RAN 130. In other implementations, V2X communications handler 610 and/or collision avoidance system 620 may be included within an OBD 112 or another system in vehicles 110-2.

Figure 7:
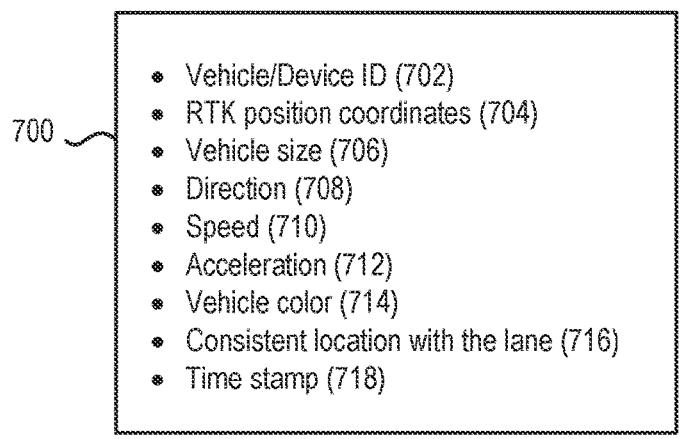
FIG. 7 is a diagram illustrating exemplary fields for a telematics data message, according to an implementation.

OBD device 112-1, camera 122, mobile device 120, and RAN 130 may report real-time location data and other related data (referred to generally herein as "telematics data") to V2X communications handler 610. OBD device 112-1 may report CL1 data 602, for example, for a vehicle 110-1. FIG. 7 is a diagram illustrating exemplary fields for a telematics data message 700 that may correspond to CL1 data 602, according to an implementation. As shown in FIG. 7, telematics data message 700 may include RTK position data 704 (e.g., geo-location coordinates), along with other sending vehicle data such as a vehicle identifier (ID) 702, a vehicle size 706 (e.g., length, width, height dimensions), a direction 708, a speed 710, an acceleration 712, a vehicle color 714, an indication of lane location consistency 716, and/or a time stamp (718). Additional information that may be included in a telematics data message 700 can include a type of vehicle (e.g., car, truck, bus, etc.), classification of a vehicle (e.g., emergency vehicle, government vehicle, private/public transportation vehicle, etc.), and/or classification of a message transmission (e.g., normal communication, emergency communication, government communication, etc.).

Returning to FIG. 6, RAN 130 may report CL2 data 604 which may include, for example, triangulation position data for a mobile communication device 120 (e.g., mobile communication device 120-2, not shown) of a passenger in vehicle 110-1. Mobile communication device 120 may report CL3 data 606 which may include, for example, GPS location information for mobile device 120-1 in vehicle 110-1. Camera 122 may report CL3 data 608 which may include, for example, images or video of an area where vehicles 110-1 and 110-2 (e.g., vehicles including OBDs 112-1 and 112-2) are located.

V2X communications handler 610 may receive CL1 data 602, CL2 data 604, CL3 data 606, and CL3 data 608. V2X communications handler 610 may apply algorithms described further herein to, for example, remove or exclude redundant less-accurate data for reporting to collision avoidance system 620. For example, given the identification of CL1 data 602, V2X communications handler 610 may determine that CL2 and CL3 data for vehicle 110-1 is not needed for reporting the location of vehicle 110-1 to vehicle 110-2. V2X communications handler 610 may determine that CL2 data 604, CL3 data 606, and CL3 data 608 are redundant with CL1 data 602 and elect to suppress (e.g., not report) CL2 data 604, CL3 data 606, and CL3 data 608 to collision avoidance system 620. According to an implementation, V2X communications handler 610 may apply high definition (HD) map data from map system 170 to help identify whether CL2 data 604, CL3 data 606, and CL3 data 608 are redundant. V2X communications handler 610 may forward the non-redundant position data for vehicle 110-1 (e.g., CL1 data 602) to collision avoidance system 620, such as may be included in MEC device 145 or an OBD 112-2 of vehicle 110-2.

Figure 8:
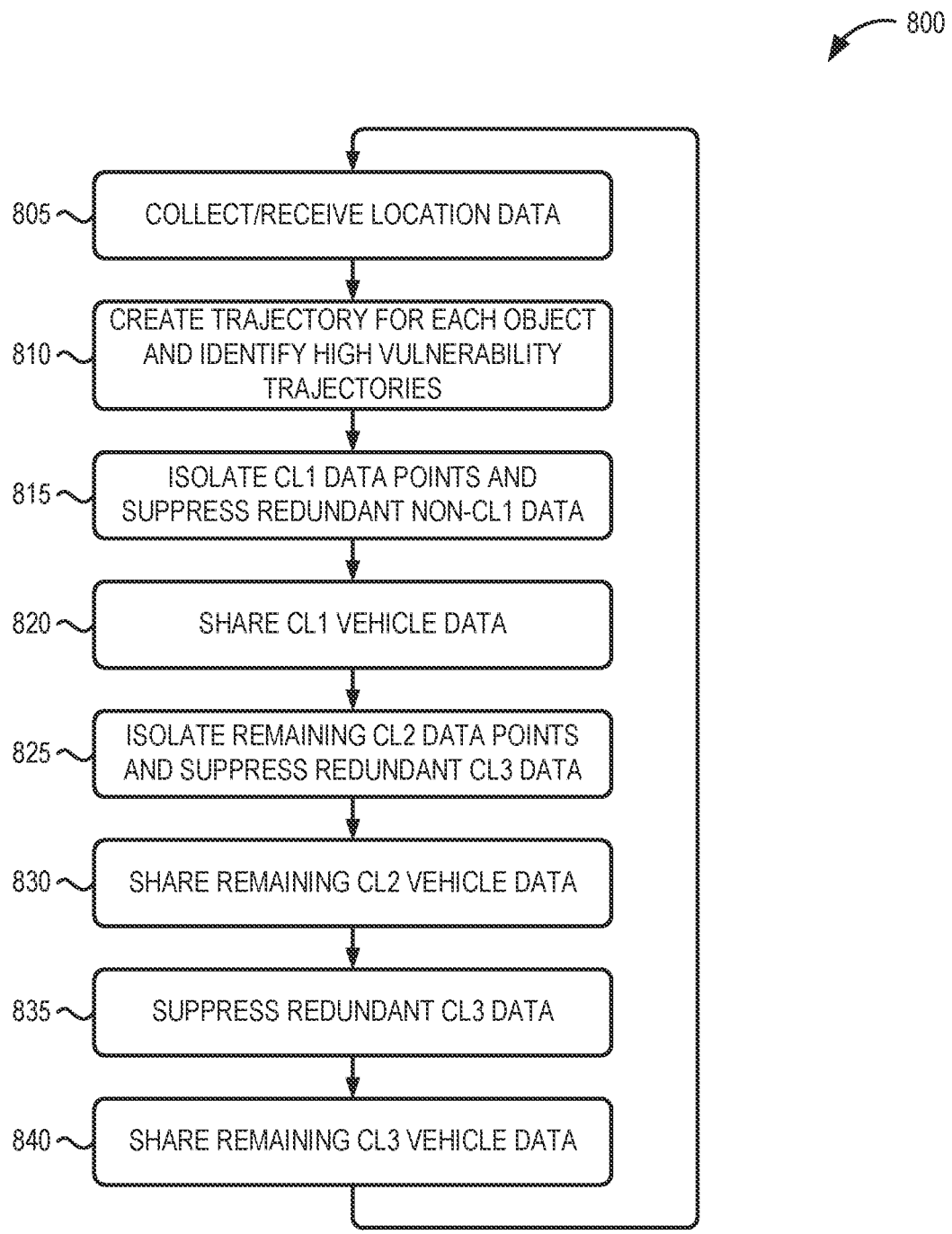
FIGS. 8-10 are flow diagrams for a process for limiting communication of redundant telematics data in V2X systems, according to an implementation described herein.

FIG. 8 is a flow diagram of a process 800 for limiting communication of redundant telematics data in V2X systems, according to an implementation. More particularly, process 800 may identify redundant V2X data and allow only the most accurate data from a group of duplicates to be passed along. Process 800 may be performed, for example, by V2X communications handler 610 (e.g., executing on MEC device 145, OBD device 112, or VCP 180).

Process 800 may include collecting or receiving location data (block 805) and creating a trajectory for each object and identifying high vulnerability trajectories (block 810). For example, V2X communications handler 610 (e.g., associated with a particular vehicle 110-1) may receive vehicle information from all vehicles 110 in a particular service area (e.g., within a sector/cell of base station 135 or a radius of vehicle 110-1). Vehicles 110 may send telematics data to V2X communications handler 610 via RAN 130. According to one implementation, for every reported vehicle 110, V2X communications handler 610 may create a trajectory of the path of that vehicle for the next 2-3 seconds. Based on the trajectories and locations, V2X communications handler 610 may determine which vehicles 110 (and/or mobile actors 116) should exchange information. Given the proximity and vector trajectory of different vehicles 110, V2X communications handler 610 may further prioritize exchange of telematics data based on vulnerability level (e.g., priority to VL-High).

Process 800 may further include isolating the highest accuracy (CL1) data points and suppress reporting of redundant non-CL1 data (block 815), and sharing the non-duplicate CL1 vehicle data (block 820). For example, V2X communications handler 610 may determine reliability metrics (e.g., confidence levels) for each location data point. As described further in connection with FIG. 9, V2X communications handler 610 may identify the high accuracy data points (e.g., RTK data) and identify corresponding redundant location data from less accurate sources. V2X communications handler 610 may forward the CL1 data for each vehicle to collision avoidance system 620 and may not forward (e.g., suppress or set aside) CL2 and CL3 data that appear to correspond to the same vehicle as indicated in the CL1 data.

Process 800 may further include isolating the remaining medium accuracy (CL2) data points and suppress reporting of redundant CL3 data (block 825), and sharing the remaining CL2 vehicle data (block 830). For example, as described further in connection with FIG. 10, V2X communications handler 610 may identify, from the remaining non-redundant data, the medium accuracy data points (e.g., triangulation data) and identify corresponding redundant location data from less accurate sources. V2X communications handler 610 may forward the CL2 data for each vehicle to collision avoidance system 620 and may not forward (e.g., suppress or set aside) CL3 data that appears to correspond to the same vehicle as the CL2 data.

Process 800 may further include suppressing reporting of redundant low accuracy (CL3) data (block 835), and sharing the remaining CL3 vehicle data (block 840). For example, as described further in connection with FIG. 11, V2X communications handler 610 may identify, from the remaining non-redundant data, the low accuracy data points (e.g., GPS and/or camera data) and identify corresponding redundant location data from among the remaining CL3 data. V2X communications handler 610 may forward the remaining CL3 data for each vehicle to collision avoidance system 620 and may not forward CL3 data that appears to correspond to the same vehicle.

Figure 9:
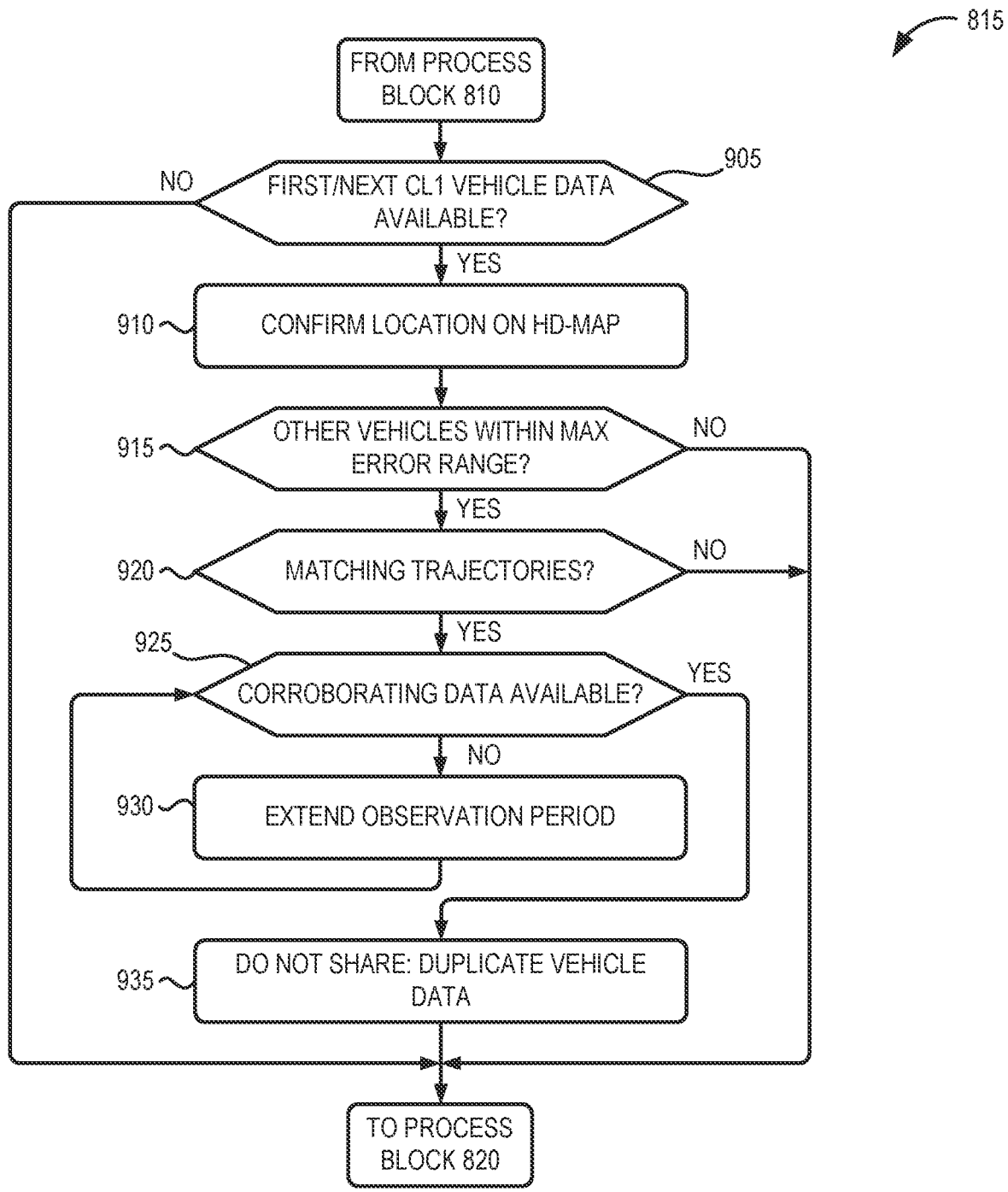

Process block 815 may include blocks illustrated in FIG. 9. Referring to FIG. 9, process block 815 may include determining if CL1 data is available (block 905). For example, V2X communications handler 610 may determine if any of the data received at process block 810 include RTK data.

If CL1 data is available (block 905—Yes), process block 815 may include confirming a location on an HD map (block 910), and determining if other vehicles are within a maximum error range (block 915). For example, for every RTK vehicle data set, V2X communications handler 610 may confirm the RTK vehicle's location on the HD-MAP (e.g., from map system 170) to ensure that the vehicle is in a specific lane/road and direction. V2X communications handler 610 may search from the center of the RTK vehicle for the presence of other reported vehicles within a maximum error range. The maximum error range may be calculated as a function of the positioning error of one vehicle (e.g., centimeters for the RTK vehicle) plus the positioning error of the second vehicle (e.g., one or more meters for the non-RTK vehicle) and any reported vehicle dimensions.

If another vehicle is within a maximum error range (block 915—Yes), it may be determined if the vehicles have matching trajectories (block 920). For example, V2X communications handler 610 may compare recent location data from each of the RTK vehicle and the non-RTK vehicle to determine if they have the same trajectory (i.e., collinear trajectories).

If the vehicles have matching trajectories (block 920—Yes), it may be determined if there is corroborating data available to confirm duplicate vehicles (block 925). For example, V2X communications handler 610 may determine if other telematics data from the RTK vehicle and the non-RTK vehicle can be matched. For example, speed, size, color, or other data reported for each vehicle data point may be matched.

If no corroborating data is available (block 925—No), extended observation may be performed (block 930) before returning to process block 925. For example, V2X communications handler 610 may extend observation for a new time period ΔT (where ΔT is a small enough time to see if two vehicles are on a collision course or, in fact, the same vehicle).

If there is corroborating data available (block 925—Yes), the other vehicle information is marked as a duplicative and not shared (block 935). For example, V2X communications handler 610 may confirm a trajectory with at least one other piece of corroborating data to verify that the RTK vehicle and the non-RTK vehicle are the same. Thus, communications handler 610 may suppress (or not share) message with the redundant, less-accurate non-RTK vehicle data.

If no CL1 data is available (block 905—No), if no other vehicle is within a maximum error range (block 915—No), if the vehicles do not have matching trajectories (block 920—No), or after the other vehicle information is marked as duplicative and not shared (block 935), process block 815 may proceed to process block 820. For example, communications handler 610 may proceed to report any CL1 data to collision avoidance system 620.

Figure 10:
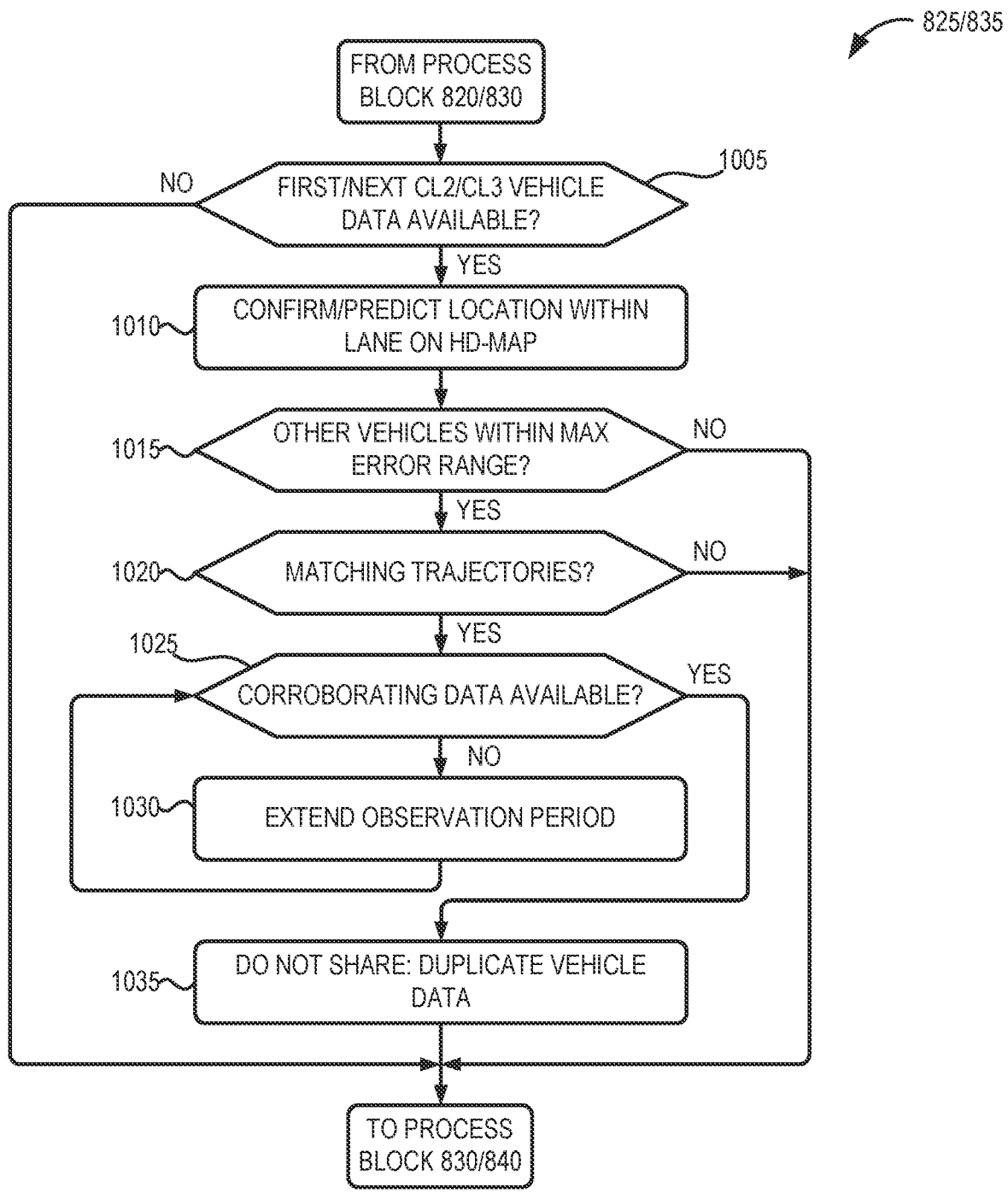

Process blocks 825 and 835 may include blocks illustrated in FIG. 10. Referring to FIG. 10, in one implementation, process block 825 may include determining if CL2 data is available (block 1005). For example, V2X communications handler 610 may determine if any of the data received in process block 810, and not suppressed after process block 815, includes triangulation data (e.g. from RAN 130 or mobile communication device 120).

In another implementation, process block 835 may include determining if CL3 data is available (block 1005). For example, V2X communications handler 610 may determine if any CL3 data is available, after process block 825, that was not previously identified as duplicative.

If CL2 data is available for process block 825 or if CL3 data is available for process block 835 (block 1005—Yes), process block 825/835 may include confirming or predicting a location on an HD map (block 1010). For example, for every CL2 vehicle data set, V2X communications handler 610 may determine if a vehicle's location is shown within a lane on the HD-MAP (e.g., from map system 170). If the CL2 vehicle data does not show the vehicle within a center area of a lane, V2X communications handler 610 may calculate the nearest lane center for the CL2 vehicle and a predicted path along the middle of the lane for the CL2 vehicle. If the vehicle's location is shown within a lane center on the HD-MAP, no prediction is used.

Process block 825/835 may also include determining if other vehicles are within a maximum error range (block 1015). For example, V2X communications handler 610 may search from the center of the CL2 or CL3 vehicle for the presence of other reported vehicles within a maximum error range. The maximum error range may be calculated as a function of the positioning error of one vehicle (e.g., up to one meter for the CL2 vehicle) plus the positioning error of the second vehicle (e.g., more than one meter for a CL3 vehicle) and any reported vehicle dimensions.

If another vehicle is within a maximum error range (block 1015—Yes), it may be determined if the vehicles have matching trajectories (block 1020). For example, V2X communications handler 610 may compare recent location data from each of the CL2 vehicle and a CL3 vehicle (e.g., that is within the maximum error range) to determine if they have the same trajectory.

If the vehicles have matching trajectories (block 1020—Yes), it may be determined if there is corroborating data available to confirm duplicate vehicles (block 1025). For example, V2X communications handler 610 may determine if other telematics data from the CL2 vehicle and the CL3 vehicle (or two CL3 vehicles) can be matched. For example, speed, size, color, or other data reported for each vehicle data point may be matched.

If no corroborating data is available (block 1025—No), extended observation may be performed (block 1030) before returning to process block 1025. For example, V2X communications handler 610 may extend observation for a new time period ΔT (where ΔT is a small enough time to see if two vehicles are on a collision course or the same vehicle).

If there is corroborating data available (block 1025—Yes), the other vehicle information is marked a duplicative and not shared (block 1035). For example, V2X communications handler 610 may confirm a trajectory with at least one other piece of corroborating data to verify that the CL2 vehicle and the CL3 vehicle (or two CL3 vehicles) are the same. Thus, communications handler 610 may suppress (or not share) messages with the redundant and/or less-accurate CL3 vehicle data.

If no CL2 data is available for process block 825, or if no CL3 data is available for process block 835 (block 1005—No), if no other vehicle is within a maximum error range (block 1015—No), if the vehicles do not have matching trajectories (block 1020—No), or after the other vehicle information is marked as duplicative and not shared (block 1035), process block 825/835 may proceed to the next process block (e.g., 830 or 840) in process 800. For example, communications handler 610 may proceed to report any non-redundant CL2 data to collision avoidance system 620. Similarly, confirmed duplicative CL3 data (e.g., one of two different CL3 data sources) is not shared, while non-duplicative CL3 data may be distributed to collision avoidance system 620.

Systems and methods limit communication of redundant telematics data in V2X systems. A communications management device receives telematics data from multiple sources in a service area and calculates a trajectory each of the objects identified by the telematics data. The communications management device select high vulnerability trajectories based on the calculated trajectories and identifies when the telematics data from different sources, of the multiple sources, corresponds to a same vehicle. When duplicate sources are determined to provide tracking data corresponding to the same vehicle, the communications management device reports (to a collision avoidance system) the tracking data from only the most accurate of the duplicate sources.

As set forth in this description and illustrated by the drawings, reference is made to "an exemplary embodiment,"

"an embodiment," "embodiments," etc., which may include a particular feature, structure or characteristic in connection with an embodiment(s). However, the use of the phrase or term "an embodiment," "embodiments," etc., in various places in the specification does not necessarily refer to all embodiments described, nor does it necessarily refer to the same embodiment, nor are separate or alternative embodiments necessarily mutually exclusive of other embodiment(s). The same applies to the term "implementation," "implementations," etc.

The foregoing description of embodiments provides illustration, but is not intended to be exhaustive or to limit the embodiments to the precise form disclosed. Accordingly, modifications to the embodiments described herein may be possible. Thus, various modifications and changes may be made thereto, and additional embodiments may be implemented, without departing from the broader scope of the invention as set forth in the claims that follow. The description and drawings are accordingly to be regarded as illustrative rather than restrictive.

The terms "a," "an," and "the" are intended to be interpreted to include one or more items. Further, the phrase "based on" is intended to be interpreted as "based, at least in part, on," unless explicitly stated otherwise. The term "and/or" is intended to be interpreted to include any and all combinations of one or more of the associated items. The word "exemplary" is used herein to mean "serving as an example." Any embodiment or implementation described as "exemplary" is not necessarily to be construed as preferred or advantageous over other embodiments or implementations.

In addition, while series of signals and blocks have been described with regard to the processes illustrated in FIGS. 8-10, the order of the signals and blocks may be modified according to other embodiments. Further, non-dependent signals or blocks may be performed in parallel. Additionally, other processes described in this description may be modified and/or non-dependent operations may be performed in parallel.

Embodiments described herein may be implemented in many different forms of software executed by hardware. For example, a process or a function may be implemented as "logic," a "component," or an "element." The logic, the component, or the element, may include, for example, hardware (e.g., processor 220, etc.), or a combination of hardware and software.

Embodiments have been described without reference to the specific software code because the software code can be designed to implement the embodiments based on the description herein and commercially available software design environments and/or languages. For example, various types of programming languages including, for example, a compiled language, an interpreted language, a declarative language, or a procedural language may be implemented.

Use of ordinal terms such as "first," "second," "third," etc., in the claims to modify a claim element does not by itself connote any priority, precedence, or order of one claim element over another, the temporal order in which acts of a method are performed, the temporal order in which instructions executed by a device are performed, etc., but are used merely as labels to distinguish one claim element having a certain name from another element having a same name (but for use of the ordinal term) to distinguish the claim elements.

Additionally, embodiments described herein may be implemented as a non-transitory computer-readable storage medium that stores data and/or information, such as instructions, program code, a data structure, a program module, an application, a script, or other known or conventional form suitable for use in a computing environment. The program code, instructions, application, etc., is readable and executable by a processor (e.g., processor 220) of a device. A non-transitory storage medium includes one or more of the storage mediums described in relation to memory 230.

To the extent the aforementioned embodiments collect, store or employ personal information of individuals, it should be understood that such information shall be collected, stored and used in accordance with all applicable laws concerning protection of personal information. Additionally, the collection, storage and use of such information may be subject to consent of the individual to such activity, for example, through well known "opt-in" or "opt-out" processes as may be appropriate for the situation and type of information. Storage and use of personal information may be in an appropriately secure manner reflective of the type of information, for example, through various encryption and anonymization techniques for particularly sensitive information.

No element, act, or instruction set forth in this description should be construed as critical or essential to the embodiments described herein unless explicitly indicated as such. All structural and functional equivalents to the elements of the various aspects set forth in this disclosure that are known or later come to be known are expressly incorporated herein by reference and are intended to be encompassed by the claims.

What is claimed is:

1. A method, comprising:
   calculating, based on telematics data received from multiple sources, a trajectory for each of a plurality of objects in a service area;
   assigning one of multiple vulnerability categories to each of the plurality of objects relative to a vehicle based on the calculated trajectories;
   classifying the telematics data into at least two confidence levels based on expected location accuracy of each of the multiple sources;
   identifying, for objects in a highest vulnerability category of the multiple vulnerability categories, when the telematics data from different sources of the multiple sources correspond to a same object; and
   suppressing the telematics data from a first one of the different sources corresponding to the same object when a second one of the different sources corresponding to the same object has a higher confidence level, of the at least two confidence levels, than the first one of the different sources.

2. The method of claim 1, further comprising:
   prioritizing for the identifying, the objects in the highest vulnerability category of the multiple vulnerability categories.

3. The method of claim 1, further comprising:
   determining a default high vulnerability distance for each of the objects based on a first vector of a first trajectory of the vehicle, a second vector of a second trajectory of a respective one the objects, and a projected vehicle stopping time.

4. The method of claim 1, further comprising:
   reporting the telematics data from the second one of the different sources.

5. The method of claim 1, further comprising:
   identifying, after the assigning and for the objects in a next highest vulnerability category of the multiple vulnerability categories, when the telematics data from different sources of the multiple sources correspond to a second same object; and suppressing the telematics data from a third one of the different sources corresponding to the second same object when a fourth one of the different sources corresponding to the second same object has a higher confidence level, of the at least three confidence levels, than the third one of the different sources.

6. The method of claim 1, wherein classifying the telematics data into at least two confidence levels, includes:
classifying the telematics data into one of at least three categories based on the expected location accuracy levels of each source.

7. The method of claim 1, wherein identifying when the telematics data from different sources corresponds to a same object further comprises:
isolating a first object from the telematics data;
identifying a second object, from the telematics data, within an error range of the first object; and
assigning the first object and the second object as the same object when the first object and the second object have matching trajectories.

8. The method of claim 7, wherein identifying when the telematics data from different sources corresponds to a same object further comprises:
verifying the same object based on corroborating data within the telematics data.

9. A device, comprising:
a processor configured to:
calculate, based on telematics data received from multiple sources, a trajectory for each of a plurality of objects in a service area;
assign one of multiple vulnerability categories to each of the plurality of objects relative to a vehicle based on the calculated trajectories;
classify the telematics data into at least two confidence levels based on expected location accuracy of each of the multiple sources;
identify, for objects in a highest vulnerability category of the multiple vulnerability categories, when the telematics data from different sources of the multiple sources correspond to a same object; and
suppress the telematics data from a first one of the different sources corresponding to the same object when a second one of the different sources corresponding to the same object has a higher confidence level, of the at least two confidence levels, than the first one of the different sources.

10. The device of claim 9, wherein the processor is further configured to:
prioritize for the identifying, the objects in the highest vulnerability category of the multiple vulnerability categories.

11. The device of claim 9, wherein the processor is further configured to:
determine a default high vulnerability distance for each of the objects based on a first vector of a first trajectory of the vehicle, a second vector of a second trajectory of a respective one the objects, and a projected vehicle stopping time.

12. The device of claim 9, wherein the processor is further configured to:
report the telematics data from the second one of the different sources.

13. The device of claim 9, wherein the processor is further configured to:

identify, after assigning and for the objects in a next highest vulnerability category of the multiple vulnerability categories, when the telematics data from different sources of the multiple sources correspond to a second same object; and suppress the telematics data from a third one of the different sources corresponding to the second same object when a fourth one of the different sources corresponding to the second same object has a higher confidence level, of the at least three confidence levels, than the third one of the different sources.

14. The device of claim 9, wherein, when classifying the telematics data into at least two confidence levels, the processor is further configured to:
classify the telematics data into one of at least three categories based on the expected location accuracy levels of each source.

15. The device of claim 9, wherein, when identifying when the telematics data from different sources corresponds to a same object, the processor is further configured to:
isolate a first object from the telematics data;
identify a second object, from the telematics data, within an error range of the first object; and
assign the first object and the second object as the same object when the first object and the second object have matching trajectories.

16. The device of claim 15, wherein, when identifying when the telematics data from different sources corresponds to a same object, the processor is further configured to:
verify the same object based on corroborating data within the telematics data.

17. A non-transitory computer-readable medium containing instructions executable by at least one processor, the computer-readable medium comprising one or more instructions for:
calculating, based on telematics data received from multiple sources, a trajectory for each of a plurality of objects in a service area;
assigning one of multiple vulnerability categories to each of the plurality of objects relative to a vehicle based on the calculated trajectories;
classifying the telematics data into at least two confidence levels based on expected location accuracy of each of the multiple sources;
identifying, for objects in a highest vulnerability category of the multiple vulnerability categories, when the telematics data from different sources of the multiple sources correspond to a same object; and
suppressing the telematics data from a first one of the different sources corresponding to the same object when a second one of the different sources corresponding to the same object has a higher confidence level, of the at least two confidence levels, than the first one of the different sources.

18. The non-transitory computer-readable medium of claim 17, further comprising instructions for:
prioritizing for the identifying, the objects in the highest vulnerability category of the multiple vulnerability categories.

19. The non-transitory computer-readable medium of claim 17, further comprising instructions for:
reporting the telematics data from the second one of the different sources.

20. The non-transitory computer-readable medium of claim 17, wherein the instructions for classifying the telematics data into at least two confidence levels further comprises instructions for:

classifying the telematics data into one of at least three categories based on the expected location accuracy levels of each source.

\* \* \* \* \*